United States Patent

[11] 3,584,563

[72] Inventor Richard J. Chen
Winchester, Mass.

[21] Appl. No. 739,035
[22] Filed June 21, 1968
[45] Patented June 15, 1971
[73] Assignee Polaroid Corporation
Cambridge, Mass.

[54] PHOTOGRAPHIC PROCESSING APPARATUS
2 Claims, 4 Drawing Figs.

[52] U.S. Cl. .......... 95/89, 95/13
[51] Int. Cl. .......... G03d 9/02
[50] Field of Search .......... 95/13, 89

[56] References Cited

UNITED STATES PATENTS

| | | | |
|---|---|---|---|
| 3,264,963 | 8/1966 | Finelli | 95/13 |
| 3,447,437 | 6/1969 | Tiffany | 95/13 |
| 3,457,846 | 7/1969 | Little | 95/13 |

OTHER REFERENCES

Vinal et al., " Electromotive Force of Cells At Low Temperatures" ; BUREAU OF STANDARDS SCIENTIFIC PAPERS 405—438. Vol. 17, 1922, p. 627— 634. QC1.U5.

*Primary Examiner*—Samuel S. Matthews
*Assistant Examiner*—Fred L. Braun
*Attorney*—Brown and Mikulka

ABSTRACT: A camera in which a viscous photographic processing liquid is distributed in a thin layer between an exposed photosensitive element and another element by moving the elements in superposition through a convergent passage between a pair of juxtaposed pressure-applying members biased toward one another by a substantially constant force. The viscosity of the liquid varies inversely with temperature and the speed of movement of the elements by a battery powered motor is varied in direct relation to the ambient temperature to insure uniform liquid distribution by providing a battery whose power output is a function of temperature.

INVENTOR.
Richard J. Chen

BY

Brown and Mikulka
and
Robert E. Corb
ATTORNEYS

INVENTOR.
Richard J. Chen
BY
Brown and Mikulka
and
Robert E. Corb
ATTORNEYS

PHOTOGRAPHIC PROCESSING APPARATUS

In photographic apparatus for exposing and processing photosensitive sheet material and particularly in portable, hand-held self-developing cameras, an exposed photosensitive element is treated in an externally dry process, preferably to produce a positive photographic print formed by diffusion transfer, by distributing a viscous thixotropic liquid in a thin layer between the photosensitive element and another element. The processing liquid may be provided initially in a rupturable pod or container coupled to one of the elements and is distributed between the elements by moving them in superposition, together with the rupturable container, through a convergent passage between a pair of juxtaposed pressure-applying members. For optimum results, measured, for example, in terms of image quality and uniformity as well as reliablity and repeatability, and particularly when the quantity of processing liquid available is limited to approximately the minimum amount of liquid required, the layer of processing liquid distributed between the elements in contact with the photosensitive element should be of uniform, predetermined thickness. When the liquid is distributed by moving the elements through a convergent passage between a pair of pressure-applying members that are free to move apart from one another and are resiliently biased toward one another, the thickness of the layer of liquid is dependent upon a number of factors including the pressure exerted by the pressure-applying members, the viscosity of the processing liquid and the speed of movement of the elements through the passage between the pressure-applying members. The nature and composition of the processing liquid are such that the viscosity of the liquid varies with changes in temperature and, since the thickness of the layer of processing liquid is, in large part, dependent upon the viscosity of the liquid, a problem arises in apparatus such as self-developing cameras which can be carried and used both indoors and out and are likely to be employed under a wide range of temperature conditions.

An object of the invention is to provide photographic apparatus of the type described in which the compressive force exerted on a film assemblage by the pressure-applying members is maintained substantially constant and the speed of movement of the film assemblage between the pressure-applying members is varied to compensate for temperature related changes in the viscosity of the processing liquid and thereby provide for distribution of the processing liquid in a layer of predetermined thickness despite changes in ambient temperature and the viscosity of the liquid.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
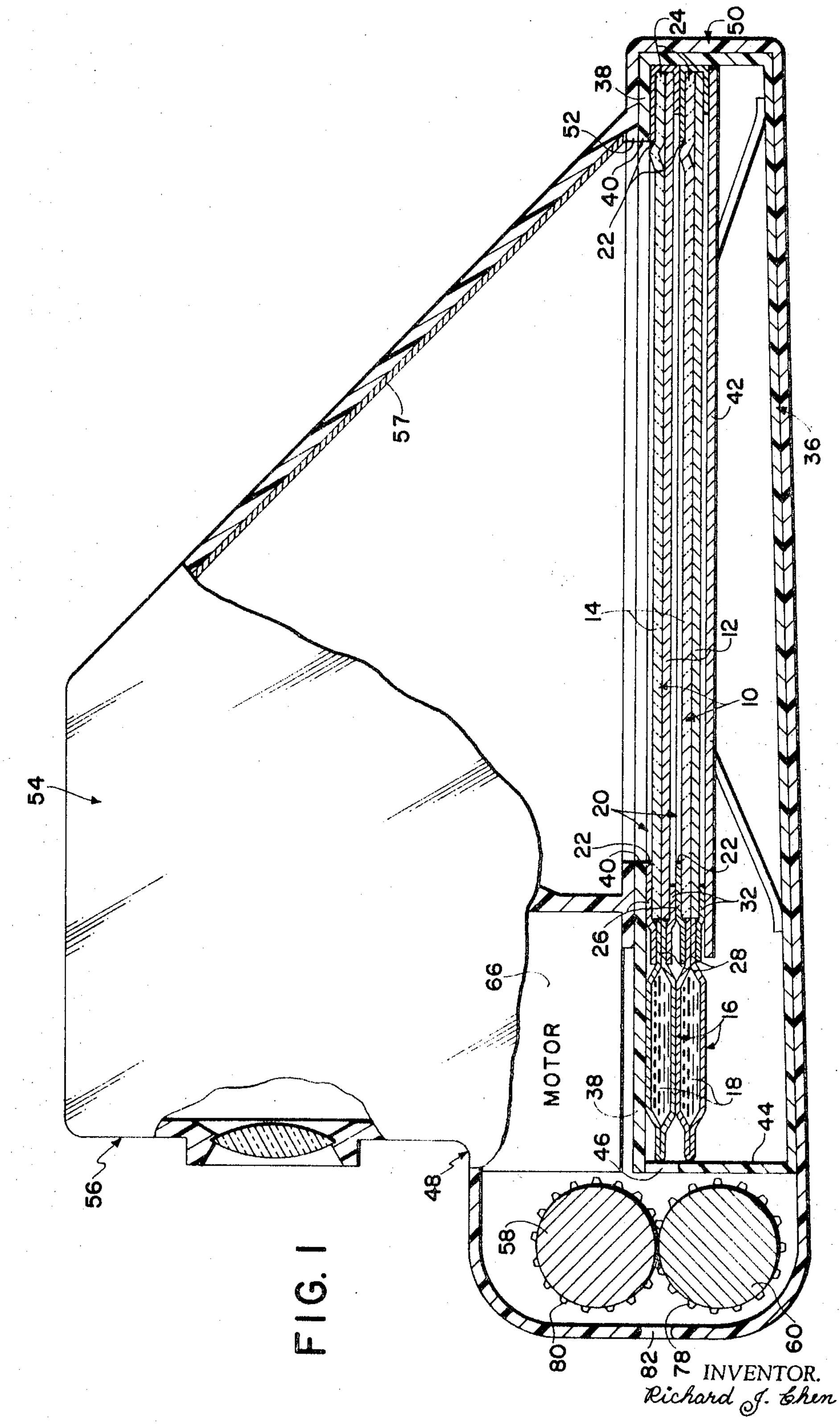
FIG. 1 is a somewhat schematic, sectional view of a camera embodying the invention and showing a film assemblage employed therein.

The photographic apparatus and process of the invention find particularly utility in the treatment of photographic film assemblages of the type including all of the materials required to produce a finished photographic print, preferably in full color, and including a photosensitive image-recording element adapted to be exposed to produce an image; a second or image-receiving element adapted to be superposed with the photosensitive element at least during processing to aid in the distribution of a viscous processing liquid in contact with the exposed photosensitive element and preferably to support a visible image formed by diffusion transfer; and a rupturable container of viscous processing liquid adapted, when distributed in contact with the exposed photosensitive element, to produce a positive image by a process in which image-forming substances are transferred by diffusion from an exposed photosensitive stratum to an image-receptive stratum. Film assemblages of this type may take a number of different forms including, for example, separate photosensitive and second sheets adapted to produce a single print or a plurality of prints; individual film units each including a pair of layers or sheets coupled with or secured to one another in face to face relation and adapted to be exposed and processed to produce a single print. The processing liquid may be supplied in a rupturable container coupled with one or both elements and adapted to be moved together with the superposed elements between the pressure-applying members; or it may be supplied from a separate source and dispensed between the elements for subsequent spreading in a thin layer during movement of the elements between the pressure-appying members.

The camera embodying the present invention is especially adapted for the treatment of photographic film units of the type shown and described, for example, in the copending U.S. Pat. application of Edwin H. Land, Ser. No. 622,287, filed Mar. 10, 1967. A typical film unit of this type includes all of the materials and the reagents required to produce a full color photographic print by a process such as disclosed in U.S. Pat. No. 2,903,606, issued May 9, 1961, in the name of Howard G. Rogers. This patent discloses a photosensitive element including a silver halide emulsion and a dye developer, that is, a dye which is a silver halide developing agent; a second or image-receiving element including an image-receptive layer of dyeable material; and a processing liquid in which the dye developer is soluble. The photosensitive and image-receiving elements are superposed with the emulsion and image-receptive layers in face-to-face relation and the processing liquid is distributed in a uniform layer of predetermined thickness between and in contact therewith for permeation into the photosensitive layer where it initiates development of exposed silver halide. The dye developer is immobilized or precipitated in exposed areas as a consequence of development while in unexposed areas and partially exposed areas of the emulsion the dye developer remains unreacted and diffusible thereby providing an imagewise distribution of unoxidized dye developer which is transferred, at least in part, by diffusion to the image-receptive layer without altering the image wise distribution of the dye developer, to form a reversed or positive color image of the developed latent image in the emulsion. Multicolor transfer images are obtained utilizing dye developers, for example, by employing an integral multilayer photosensitive element such as illustrated in FIG. 9 of the U.S. Pat. No. 2,983,606, including at least two selectively sensitized overlying photosensitive strata on a single support. A typical photosensitive element of this type comprises a support carrying a red sensitive silver halide emulsion stratum, a green sensitive silver halide emulsion stratum and a blue sensitive silver halide emulsion stratum, each emulsion having associated therewith, respectively, a cyan dye developer, a magenta dye developer and a yellow dye developer. Each set of silver halide emulsions and associated dye developer strata may be separated from other sets by interlayers formed, for example, of gelatin or polyvinyl alcohol. In the example given, the dye developers are selected for their ability to provide colors useful in producing a full color image by a subtractive process and may be incorporated in the respective silver halide emulsion with which they are associated or in a separate layer behind the respective silver halide emulsion.

Reference is now made to FIG. 1 of the drawings wherein there is illustrated film units of the foregoing type, the thickness of the materials being exaggerated for purposes of clarity of illustration. Each film unit, designated 10, comprises a photosensitive or image-recording 12; a second or image-receiving 14 and a rupturable container 16 holding a quantity of processing liquid 18. Sheets 12 and 14 are preferably, although not necessarily, rectangular and coextensive with one another and are arranged in superposed face-to-face contact with at least the lateral edges of each sheet aligned with the lateral edges of the other. The two sheets are retained in superposed relation by a binding element 20 in the form of a rectangular sheet larger than either of the photosensitive or image-receiving sheets and secured to the two sheets at the margins thereof. Binding element 20 is in the general form of a frame having a large rectangular opening 22 defining the extent of the exposed area of the film unit, surrounded by lateral edge portions and end portions 24 and 26. The lateral edge and end portion 24 of binding element 20 are adhered to the lateral and trailing end margins of second sheet 14 and are secured around the edges of the sheets and adhered to the lateral and trailing end margins of photosensitive sheet 12 thereby effectively binding the two sheets to one another along three sides thereof. The preferred form of film unit shown is adapted to produce a reflection print surrounded by a white border and viewed against a white background so that binding element 20 is formed of an opaque white material and container 16 also may be white to provide a more aesthetically pleasing product. Second sheet 14 is transparent to enable exposure of the photosensitive sheet and viewing of the image formed between the sheets.

Container 16 is of the type shown and described in U.S. Pat. No. 2,543,181 and is formed by folding a rectangular blank of fluid and air impervious sheet material medially and sealing the marginal sections of the blank to one another to form a cavity for containing processing liquid 18. The seal between longitudinal marginal sections 28 of the container is weaker than the end seals so that upon application of a predetermined force to the walls of the container in the region of the liquid-filled cavity, there will be generated within the liquid hydraulic pressure sufficient to separate longitudinal marginal sections 28 throughout the major portion of their length to form a discharge mouth through which liquid 18 is discharged. Container 16 is attached to sheets 12 and 14 at the leading edges of the sheets preferably with the longitudinal edge of the container butted against the edges of the sheets with the discharge passage of the container aligned with the facing surfaces of the sheet.

End portion 26 of binding element 20 is secured to the leading marginal edge of sheet 14 and one marginal section 28 of the container and a binding strip 32 is adhered to the leading marginal edge portion of sheet 12 and the other marginal section 28 of the container to secure the container to the sheets and cooperates with end portion 26 to provide a conduit for conducting liquid 18 from the container between the sheets at the leading ends thereof.

The embodiment of the film unit illustrated and described herein is adapted to be exposed and processed to produce a multicolor dye transfer image located between the transparent second sheet 14 on which a dyeable polymeric layer is supported and an opaque layer located between the transfer image and the photosensitive medium. This opaque layer comprises the liquid contents 18 of container 16 provided in sufficient quantity to form a layer of predetermined thickness, e.g. of the order of 0.004″, when distributed uniformly between the sheets over an area at least coextensive with opening 22 in binding element 20. The quantity of liquid 18 supplied in the container is preferably just sufficient to form a layer of the requisite thickness and extent thereby making it unnecessary to provide means for collecting and retaining excess processing liquid and also providing for minimizing the size of the container and hence, the overall size, complexity and cost of the film unit. The processing liquid contained in container 16 comprises an aqueous alkaline solution having a pH at which the dye developers are soluble and diffusible and contains an opacifying agent in a quantity sufficient to mask the dye developers retained in the image-recording layer (laminate) subsequent to processing; and a film-forming, viscosity increasing agent or agents, to facilitate rupture of the container and distribution of the liquid processing composition and assist in maintaining the layer of processing composition as a structurally stable layer tending to bind the sheets to one another.

Subsequent to exposure, film unit 10 is processed by moving the film unit, with container 16 foremost, relative to and between a pair of juxtaposed pressure applying members into and through a convergent passage between the members for applying compressive pressure first to the container to eject the fluid contents of the container between the photosensitive and image-receiving sheets 12 and 14 and then spread processing liquid 18 in a uniform thin layer between the sheets over an area at least coextensive with opening 22 in binding element 20. As previously noted, the processing liquid includes an agent for increasing the viscosity of the liquid so as to promote the opening of the discharge passage of the container throughout substantially its entire length and facilitate the discharge of the liquid from the container and spreading of the liquid between the sheets. For this purpose the liquid should be quite viscous and contain the film-forming agent in quantity sufficient to impart a viscosity in excess of 1,000 centipoises at a temperature of 20° C. and preferably of the order of 1,000 to 200,000 centipoises at said temperature. The processing liquid is preferably thixotropic thereby facilitating complete rupture of the bond between sections 28 of the container comprising the discharge passage and subsequent spreading of the liquid between the sheets.

A liquid processing composition suitable for incorporation in container 16 for use in combination with sheet materials of the type described to produce a full color transfer image is disclosed in the following example:

| | | |
|---|---|---|
| Water | cc | 100 |
| Potassium hydroxide | grams | 11.2 |
| Hydroxyethyl cellulose [1] | do | 3.4 |
| N-benzyl-α-picolinium bromide | do | 1.5 |
| Benzotriazole | do | 1.0 |
| Titanium dioxide | do | 40.0 |

[1] High viscosity (commercially available from Hercules Powder Co., Wilmington, Delaware, under the trade name Natrasol 250).

The viscosity of an aqueous liquid processing composition of the foregoing type varies inversely with temperature, increasing as the temperature is lowered and decreasing as the temperature is raised.

A pair of film units 10 are illustrated as comprising part of a film assemblage or pack adapted to be employed in a hand-held camera. The film assemblage or pack includes a box or container 36 adapted to hold a plurality of film units 10 arranged in stacked relation and includes a forward wall 38 provided with an exposure aperture 40 substantially coextensive with opening 22 in binding element 20 and a spring and pressure plate assembly 42 for supporting the film units against the forward wall with the forwardmost film unit located in position for exposure in alignment with aperture 40. Box 36 includes an end wall 44 provided with a narrow slot 46 permitting the movement of the film units — one at a time — from the box through the slot.

A camera of the type adapted to employ the film assemblage for exposing and processing the film units thereof, as illustrated in FIG. 1 as comprising a housing 48 including a rear section 50 for holding and enclosing container 36, and an intermediate wall having an exposure aperture 52 for locating the forward wall 38 of container 36 in position for exposure of the forwardmost film unit supported against wall 38. The camera includes a forward section 54 for supporting a conventional lens, shutter assembly 56 and providing a light path between the lens and a film unit positioned for exposure behind exposure aperture 52, and enclosing a mirror 57 located in a plane at 45°with respect to the optic axis of the lens for reversing the image formed thereby.

Figure 2:
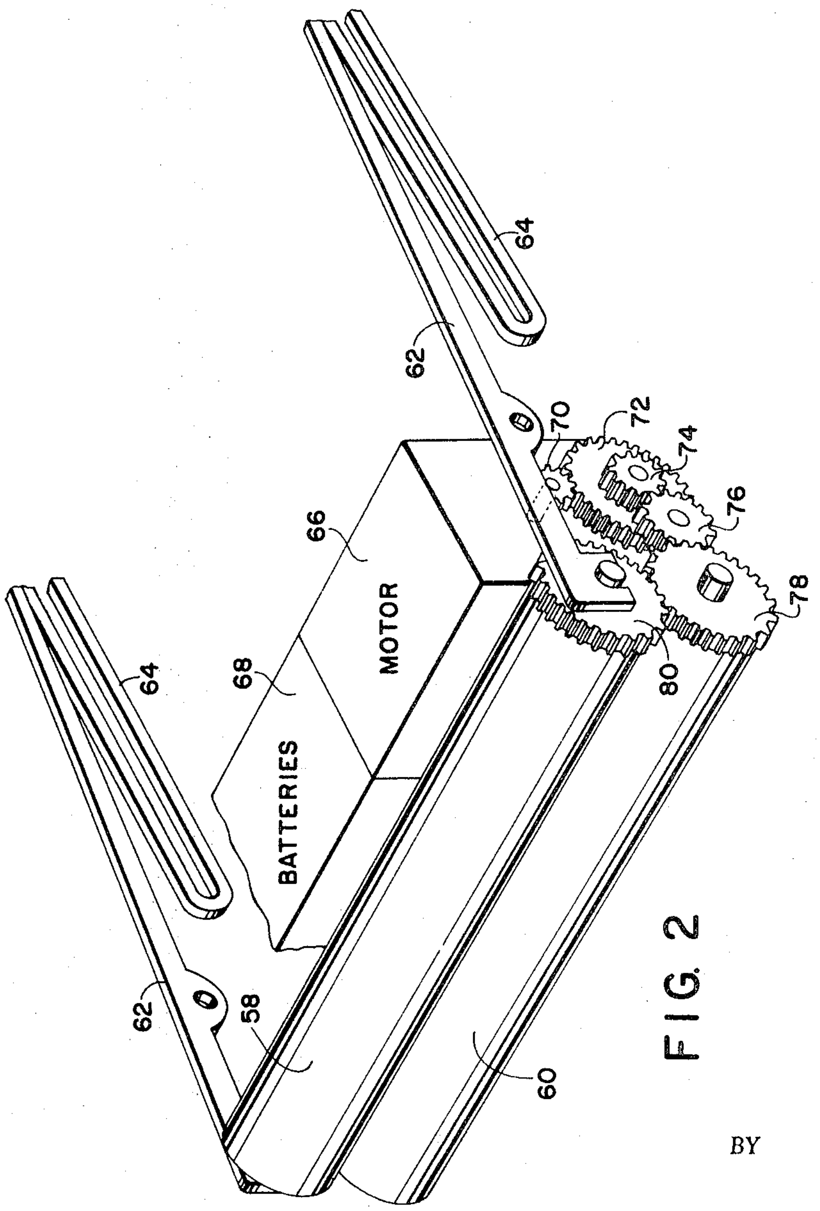
FIG. 2 is a perspective view showing components of the camera of FIG. 1.

The preferred means for spreading the processing liquid in a thin layer between the sheets of a film unit includes a pair of juxtaposed member such as cylindrical rolls 58 and 60 cooperating to define a convergent passage or throat through which the sheets are moved in superposition with the container 16 foremost to dispense the liquid contents of the container between the leading end portions of the sheets and then distribute the liquid from the leading end of the sheets toward the trailing end thereof. As shown in FIG. 2, roll 60 is mounted for rotation in a substantially fixed position and roll 58 is mounted for rotation about an axis located in the same plane as the axis of roll 60 and for movement toward and away from roll 60. The means for mounting roll 58 include a pair of levers 62 pivoted intermediate their ends and each having means on one end supporting one end of roll 58 for rotation about its axis. U-shaped springs 64 are provided in engagement with the opposite ends of levers 62 from roll 58, for biasing the levers so as to urge roll 58 toward roll 60. Springs 64 are preferably of a type having a relatively low spring rate so that the compressive force exerted on a film assemblage during movement thereof between the rolls remains substantially constant despite changes in the separation of the rolls and the deflection of the springs due to variations in the thickness of the materials comprising the film unit.

Figure 3A:
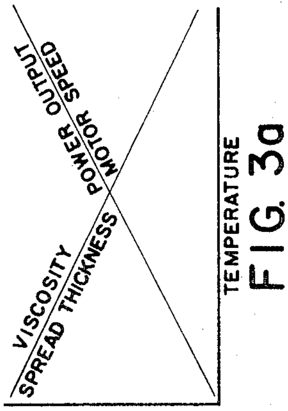
FIG. 3 illustrates the relationships between (A) viscosity and battery power output and temperature, and (B) motor speed and spread thickness.
Figure 3B:
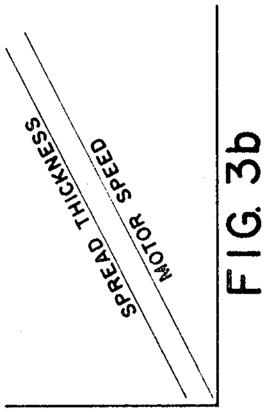

As previously noted, the thickness of the layer of processing liquid distributed between the elements of a film unit is a function of the compressive pressure exerted on the film unit by the pressure-applying members, the viscosity of the processing liquid (see FIG. 3A) and the speed of movement of the film assemblage through the convergent passage between the pressure-applying members (see FIG. 3B). In a hand-held camera such as disclosed, it may be impossible to maintain the camera and film at a constant temperature so that one of the factors, i.e. liquid viscosity, controlling the liquid spread thickness will constitute an independent variable while another factor, i.e. pressure, remains substantially constant, so that control over the thickness of the layer of processing liquid distributed within a film unit can be achieved by controlling the third variable, namely, the speed of movement of the film unit between the pressure-applying rolls.

In the form of camera shown, the film unit is moved between the pressure-applying rolls to spread the processing liquid by advancing the leading end of the film unit into the bite of the rolls and the driving the rolls in frictional engagement with the film unit. The means for driving the rolls comprise an electric motor 66, a source of energy for powering the motor in the form of a battery or batteries 68 and a transmission comprising a gear train including gears 70, 72, 74, 76 and 78, for driving roll 60. A gear 80 maybe coupled with roll 58 and meshed with gear 78 on roll 60 for driving roll 58. The housing includes an opening 82 through which film units 10 may be advanced by rolls 58 and 60, and means (not shown) are provided for moving each film unit, following exposure thereof, from exposure position within container 36 through a slot 46 into the bite of rolls 58 and 60.

It has been found that the thickness of the layer of processing liquid spread within a film unit varies, as shown in FIG. 3A, in direct relation with the speed of movement of the film unit between the pressure-applying members so that this thickness can be increased by increasing the speed of movement and, conversely, decreased by decreasing the speed of movement. Similarly the thickness of the layer of liquid also varies directly with the viscosity of the processing liquid and hence inversely as the temperature of the processing liquid. Accordingly constant liquid spread thickness can be obtained by varying the speed of movement of the film unit directly as the temperature; that is, by moving the film more slowly at lower temperatures to compensate for the increased viscosity of the liquid and moving the film more rapidly at higher temperatures to compensate for the reduced viscosity of the liquid.

In accordance with the invention, the camera includes means for automatically sensing the ambient temperature and varying the rate of rotation of rolls 58 and 60 in accordance with the temperature so as to maintain constant, a relationship between liquid viscosity and speed of movement of the film that will insure spreading of the processing liquid in a layer of predetermined depth even though the temperature and viscosity may vary. Such means may simply and conveniently comprise a battery 68 that is sensitive to temperature, that is, having a power output characteristic (see FIG. 3A) that varies in a predetermined manner as a function of temperature, and a motor 66 coupled with the battery for driving rolls 58 and 60 at a speed that varies in direct relation to the power supplied by the battery. The curve representing the power vs. temperature characteristic of the battery may be designed to compliment the curve representing the relationship between viscosity and temperature to provide for movement of the film at a speed that will insure a predetermined spread thickness over a range of temperatures. Types of batteries having power outputs varying with temperature and suitable for incorporation in a hand-held camera for powering a conventional direct-current motor include, for example, carbon-zinc, mercury, and manganese-alkaline.

Although the invention has been illustrated in connection with a pair of pressure-applying members in the form of rolls with the film being moved between the rolls by rotation thereof, other forms of pressure-applying members and other means for moving the film through the convergent passage between the pressure-applying members are know in the art and considered to fall within the scope of the invention. Such other forms of pressure-applying members include, for example, nonrotatable members that are rigid and biased toward one another, or members dependent for their relative mobility and ability to apply pressure, on their intrinsic resilience. With embodiments of pressure-applying members that are not rotatable and driven, other means are provided for pushing or drawing the film between the pressure-applying members, such other means being conventional and known in the art.

It should be noted and appreciated that the novel apparatus of the invention enables the performance, over a wide range of temperature conditions, of a photographic process, particularly a diffusion transfer process, in which a viscous processing liquid characterized by a viscosity inversely proportional to temperature is distributed in a thin layer between a pair of sheetlike elements by advancing the elements in superposition through a convergent passage between a pair of pressure-applying members. With the present invention, it is possible to achieve uniform liquid distribution of a predetermined thickness automatically and with simple apparatus which lends itself to incorporation in compact, light weight portable cameras; and to employ film structures including a minimum of excess processing liquid and which, as a result, do not require complex, expensive and/or bulky structures for collecting excess processing liquid. The certainty with which uniform liquid distribution of predetermined thickness is obtained, provides for consistent, reliable and high-quality results not obtainable with systems wherein the liquid thickness is subject to variations resulting from changes in temperature.

Since certain changes may be made in the above apparatus without departing from the scope of the invention herein involved, it is intended that all matter contained in the above description or shown in the accompanying drawings shall be interpreted as illustrative and not in a limiting sense.

What I claim is:

1. In photographic processing apparatus for treating an exposed photosensitive element by distributing a liquid processing agent having a viscosity which varies with temperature, as a thin layer in contact with said photosensitive element, said apparatus comprising a pair of pressure members mounted in juxtaposition for relative movement toward and away from one another and cooperating to provide a convergent passage between said members through which a photosensitive element and a second element are moveable in superposition to distribute a viscous liquid processing agent in a thin layer between said elements, and biasing means for urging said pressure members toward one another with a substantially constant force, the improvement including means for varying the speed of movement of the elements as a function of temperature to maintain a substantially uniform, predetermined liquid layer thickness, the last-mentioned means comprising in combination:

advancement means for moving said elements in superposition through said convergent passage between said members;

an electric motor for driving said advancement means at a rate that varies directly with the power supplied to said motor; and a battery coupled with said motor for supplying power thereto, said battery having a power output which varies directly with the temperature of said battery for automatically varying the speed of movement of said elements in direct relation to the ambient temperature.

2. Photographic processing apparatus as defined in claim 1 wherein said biasing means include relatively low rate spring means.